US00RE50328E

(19) United States
(12) Reissued Patent
Merlin

(10) Patent Number: US RE50,328 E
(45) Date of Reissued Patent: Mar. 4, 2025

(54) FORMING OVERLAYS AT USER'S PREMISES AND UTILIZING THEM FOR SELECTIVE COMBINATIONS OF TV BROADCAST CHANNEL FORMAT MATERIAL AND IP-FORMAT MATERIAL

(71) Applicant: TVNGO LTD. (BVI), Amsterdam (NL)

(72) Inventor: Yakkov Merlin, Raanana (IL)

(73) Assignee: TVnGO LTD (BVI), Amsterdam (NL)

(21) Appl. No.: 17/867,612

(22) Filed: Jul. 18, 2022

Related U.S. Patent Documents

Reissue of:
(64) Patent No.: 9,407,969
Issued: Aug. 2, 2016
Appl. No.: 13/336,189
Filed: Dec. 23, 2011

U.S. Applications:
(63) Continuation of application No. 11/794,825, filed as application No. PCT/IL2005/000035 on Jan. 11, 2005, now Pat. No. 8,132,220.

(51) Int. Cl.

| | |
|---|---|
| ***H04N 21/443*** | (2011.01) |
| ***H04N 21/431*** | (2011.01) |
| ***H04N 21/433*** | (2011.01) |
| ***H04N 21/438*** | (2011.01) |
| ***H04N 21/44*** | (2011.01) |
| ***H04N 21/462*** | (2011.01) |
| ***H04N 21/4782*** | (2011.01) |
| ***H04N 21/61*** | (2011.01) |
| ***H04N 21/643*** | (2011.01) |

(Continued)

(52) U.S. Cl.
CPC ... *H04N 21/44016* (2013.01); *H04N 21/4316* (2013.01); *H04N 21/4331* (2013.01); *H04N 21/4381* (2013.01); *H04N 21/4438* (2013.01); *H04N 21/4622* (2013.01); *H04N 21/4782* (2013.01); *H04N 21/6118* (2013.01); *H04N 21/6125* (2013.01); *H04N 21/6143* (2013.01); *H04N 21/64322* (2013.01); *H04N 21/812* (2013.01); *H04N 21/854* (2013.01); *H04N 21/431* (2013.01)

(58) Field of Classification Search
CPC ..... H04N 21/44016; H04N 21/4782; H04N 21/4316; H04N 21/4622; H04N 21/431
USPC ..... 725/109; 715/717, 718; 345/629
See application file for complete search history.

(56) References Cited

U.S. PATENT DOCUMENTS 5,990,927 A * 11/1999 Hendricks ..... H04N 21/2389 725/132
6,136,898 A 10/2000 Loza et al.
(Continued)

FOREIGN PATENT DOCUMENTS

WO WO 00/08855 2/2000
WO WO 02/19689 A 3/2002

OTHER PUBLICATIONS

Office Action dated Sep. 28, 2022 in U.S. Appl. No. 17/714,917, 16 pages.

(Continued)

*Primary Examiner* — Adam L Basehoar
(74) *Attorney, Agent, or Firm* — Fish IP Law, LLP; Tomas A. Prieto

(57) ABSTRACT

A method of displaying an Internet signal on a TV. Preferably, at least a portion of the Internet signal is selectively displayed by a remote activation control signal.

19 Claims, 7 Drawing Sheets

(51) Int. Cl.
*H04N 21/81* (2011.01)
*H04N 21/854* (2011.01)

(56) References Cited

U.S. PATENT DOCUMENTS

| | | | | |
|---|---|---|---|---|
| 6,240,555 | B1 | 5/2001 | Shoff et al. | |
| 6,351,270 | B1 | 2/2002 | Nishikawa et al. | |
| 6,510,557 | B1 * | 1/2003 | Thrift | H04N 21/4316 725/111 |
| 6,606,746 | B1 | 8/2003 | Zdepski et al. | |
| 7,124,430 | B2 * | 10/2006 | Aratani et al. | 725/142 |
| 7,340,457 | B1 * | 3/2008 | Killian et al. | |
| 7,456,902 | B2 | 11/2008 | Kikinis | |
| 2002/0007493 | A1 * | 1/2002 | Butler et al. | 725/109 |
| 2002/0144273 | A1 * | 10/2002 | Reto | H04L 65/1101 348/E7.071 |
| 2003/0030652 | A1 * | 2/2003 | Billmaier | H04N 21/4438 725/135 |
| 2004/0107437 | A1 * | 6/2004 | Reichardt et al. | 725/37 |
| 2005/0235319 | A1 * | 10/2005 | Carpenter | H04N 21/4622 348/E5.103 |
| 2010/0085483 | A1 * | 4/2010 | Pan | H04N 21/4622 348/E5.103 |
| 2013/0002716 | A1 * | 1/2013 | Walker | H04N 21/47205 345/629 |

OTHER PUBLICATIONS

Plaintiff's Brief in Response to the Court's Mar. 6, 2020 Order in Civil Action No. 1:18-cv-10238-RMB-KMW, US District Court for the District of New Jersey, 15 pages.

* cited by examiner

FORMING OVERLAYS AT USER'S PREMISES AND UTILIZING THEM FOR SELECTIVE COMBINATIONS OF TV BROADCAST CHANNEL FORMAT MATERIAL AND IP-FORMAT MATERIAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This is a Continuation Application filed under 35 U.S.C. §120 as a continuation of U.S. patent application Ser. No. 11/794,825, filed on Jul. 6, 2007, which was a National Phase under 35 U.S.C. §371 of International Application No. PCT/IL2005/000035, filed on Jan. 11, 2005, the content of each of which is hereby incorporated by reference in their entirety.

FIELD OF THE INVENTION

This invention relates to the broadcast of audio/video content over the TV infrastructure and Internet.

BACKGROUND OF THE INVENTION

With the proliferation of cable TV and the high bandwidth currently available for the Internet, which promises to increase even more in the near future, Internet TV is fast becoming a viable alternative to regular and cable TV broadcast channels. Moreover, Internet TV is not subject to the government licensing laws required by cable and broadcast TV channels and thus offers programs that may not be obtainable using regular and cable TV broadcast channels.

It is not uncommon for Internet broadcasters to offer near DVD-quality movies that can be viewed either using video streaming or downloaded to the hard disk of a subscriber's computer for viewing "off-line". The video quality of such movies is vastly superior to that obtainable on a regular TV set, owing to the high resolution associated with computer displays that cannot presently be matched by TV screens. However, this is not particularly troublesome where only pictures are displayed; but it becomes a problem when textual information is displayed that is formatted for high resolution computer monitors since the text is then barely legible when displayed on lower resolution TV screens. Thus, if a regular TV set is used to display Internet content that is rich in text, the resulting display quality is poor.

It would therefore be a significant benefit to users of low resolution displays such as TV screens, to be able to watch regular and cable TV broadcasts and to integrate with Internet content on demand. In particular, it would be desirable to provide such a user with a visual and legible indication when viewing a regular or TV broadcast of available Internet movies or other programs and allow him to use the displayed indication to integrate with a desired Internet broadcast.

These requirements have been only partially addressed in the art. WO 00/08855 to United Video Properties, Inc. and entitled "A system and method for synchronizing television-related product content and internet-delivered information" describes a screen generator that merges program guide data with a TV image and superimposes an Interactive TV Guide on the regular TV image.

US 2002/0093594 (Kikinis) entitled "Method and system for identifying addressing data within a television presentation" illustrates in FIG. 5 the common connection of TV and Internet to a set-top box.

U.S. Pat. No. 6,606,746 to OpenTV, Inc. entitled "Interactive television system and method for displaying a graphical user interface using insert pictures" discloses interactive television having a compressed background picture and one or more compressed insert pictures commonly connected to a TV-Internet Integration box. The compressed insert pictures represent items of a GUI. The local system i.e. computer "pastes" the insert pictures into the background image.

U.S. Pat. No. 6,130,898 to Bell Atlantic Network Services, Inc., entitled "Simulcasting digital video programs for broadcast and interactive services" teaches an interactive TV system where TV broadcast data is merged with Internet data. To this end, public wireless packet data network is combined with a broadband digital broadcast network at a plurality of transmitter sites. Customer premises receiving systems include a receiving antenna and one or more digital entertainment terminals. The terminal includes a channel selector and digital receiver for capturing a digital transport stream from a selected channel. A processor converts selected program information from the transport stream for presentation, e.g. via a television set. The terminal also includes a CPU controlling the operation of the channel selector and the processor in response to user inputs.

None of these references appears to disclose the ability to merge broadcast TV signals with IP packet data at a customer site, specifically in such a manner that a conventional TV set is able to display Internet program selection data while viewing a TV broadcast program and to use the selected data to select an Internet channel, such as a movie, for display on the TV set instead of the TV broadcast program.

SUMMARY OF THE INVENTION

It is therefore an object of the present invention to provide a TV-Internet Integration Box having the ability to merge broadcast TV signals with IP packet data at a customer site.

It is a further object that such a TV-Internet Integration Box permits a TV set connected thereto to display Internet program selection data while viewing a TV broadcast program and to use the selected data to select an Internet movie for display instead of the TV broadcast program.

These objectives are realized in accordance with a first aspect of the invention by a method for facilitating first data broadcast over a TV subscriber channel to be displayed simultaneously together with second data broadcast over a digital data communications network, the method comprising:

receiving said first data and said second data;

combining said first data and said second data to form a combined video signal; and conveying said combined video signal to a TV set in a user premises for displaying a first image corresponding to the first data and having superimposed thereon a second image corresponding to the second data, said second image being configured to allow a user at said user premises to interact therewith for redirecting to the digital data communications network and displaying a program broadcast thereby in at least a portion of the TV set.

In accordance with a second aspect of the invention there is provided a method for facilitating first data broadcast over a TV subscriber channel to be displayed simultaneously together with second data broadcast over a digital data communications network, the method comprising:

receiving said first data at a user premises;

receiving said second data at the user premises according to a user-profile associated with the second data;

combining said first data and said second data to form a combined video signal; and conveying said combined video signal to a TV set in a user premises for displaying a first image corresponding to the first data and having superimposed thereon a second image corresponding to the second data, said second image being configured to allow a user at said user premises to interact therewith redirecting to the digital data communications network and displaying a program broadcast thereby in at least a portion of the TV set.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
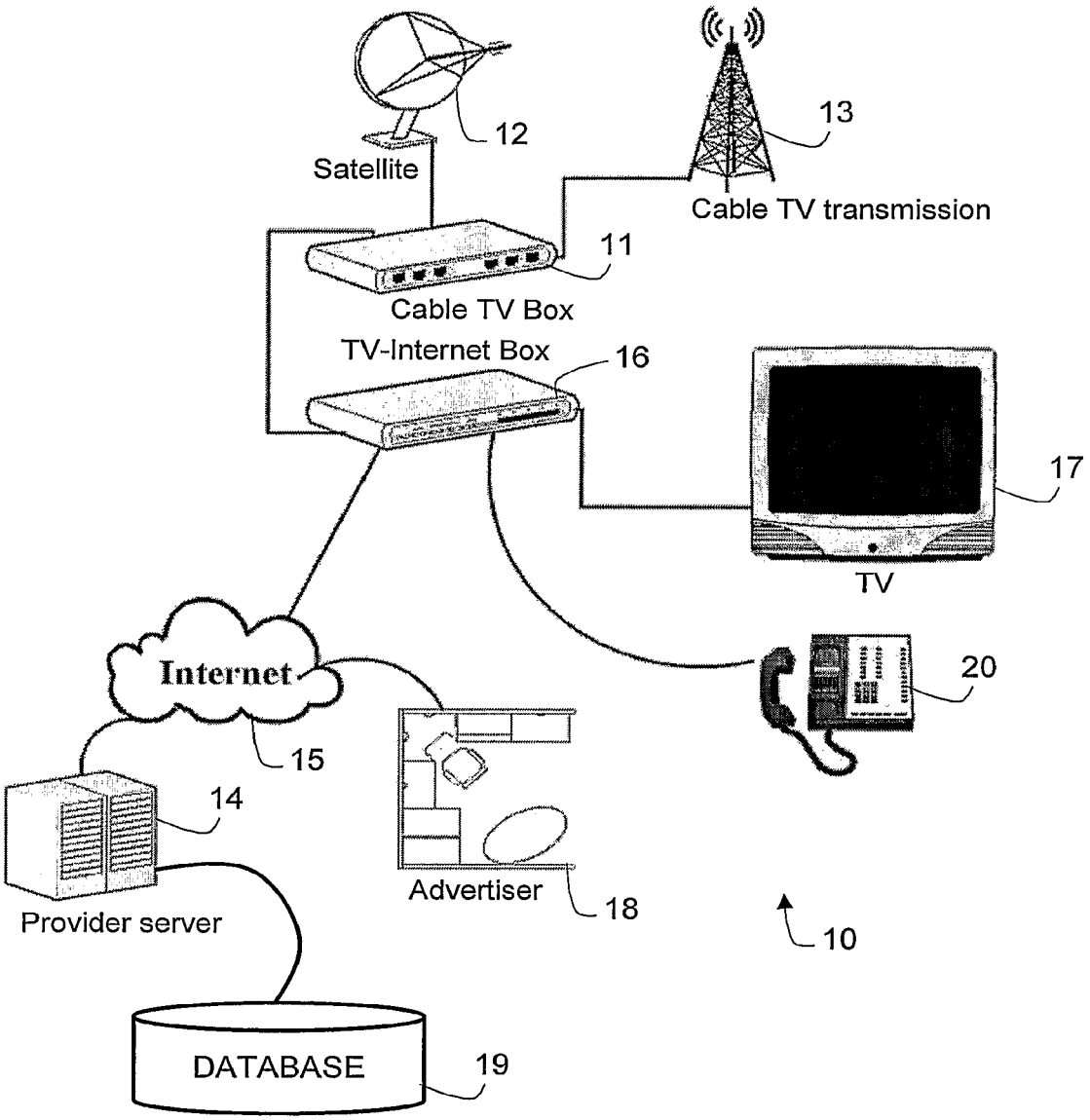
FIG. 1 is pictorial representation showing a TV-Internet Integration Box according to the invention connected to a mixed broadcast network for combining Internet and broadcast TV signals.

FIG. 1 is pictorial representation showing a mixed broadcast network 10 having a Cable TV Box 11 coupled to a satellite 12 and a Cable TV transmitter 13 for receiving a cable TV broadcast signal (constituting first data). An Internet broadcast signal comprising IP packet data (constituting second data) is streamed from a web server 14 via the Internet 15 (constituting a digital data communications network) to a TV-Internet Integration Box 16 (*e.g., including a circuit, processor, etc.*) for display on a TV set 17 coupled thereto. The TV set 17 may be constituted by a computer having a video card and a high resolution display monitor. However, the principal benefit of the invention is obtained when a regular TV set having low resolution is used, since such a configuration has not so far been used to integrate Internet programs with conventional TV broadcasts in the manner proposed by the invention. The TV-Internet Integration Box 16 is connected to the Cable TV Box 11 for combining the broadcast TV signals received by the Cable TV Box 11 with the IP packet data broadcast via the Internet 15. Also shown is an advertiser 18 having a computer coupled to the Internet 15 for downloading advertising content to the web server 14 for storage in a database 19 and a telephone 20 coupled to the TV-Internet Integration Box 16 for feeding telephony signals to the TV-Internet Integration Box 16, which combines the received telephony signals with video data received from the Cable TV Box 11 and/or the Internet 15.

The advertiser 18 typically pays for specific time slots and for one or more specific channels during which his advertisement will be broadcast. Thus, in addition to the advertising content which is prepared and then stored on the web server 14 in known manner, the advertiser 18 also specifies when the advertisement is to be broadcast and on which TV channel or channels. By such means, a sports advertiser can request time during the interval of a football match to broadcast a commercial, while a toy advertiser would obviously prefer to broadcast a commercial during a children's TV program. Different time slots may be charged out at different rates depending on the ratings associated with the associated TV program. After selecting one or more time slots, the advertisement content as well as the selected time slots and program data are stored in the database 19 accessed by the web server 14.

Figure 2:
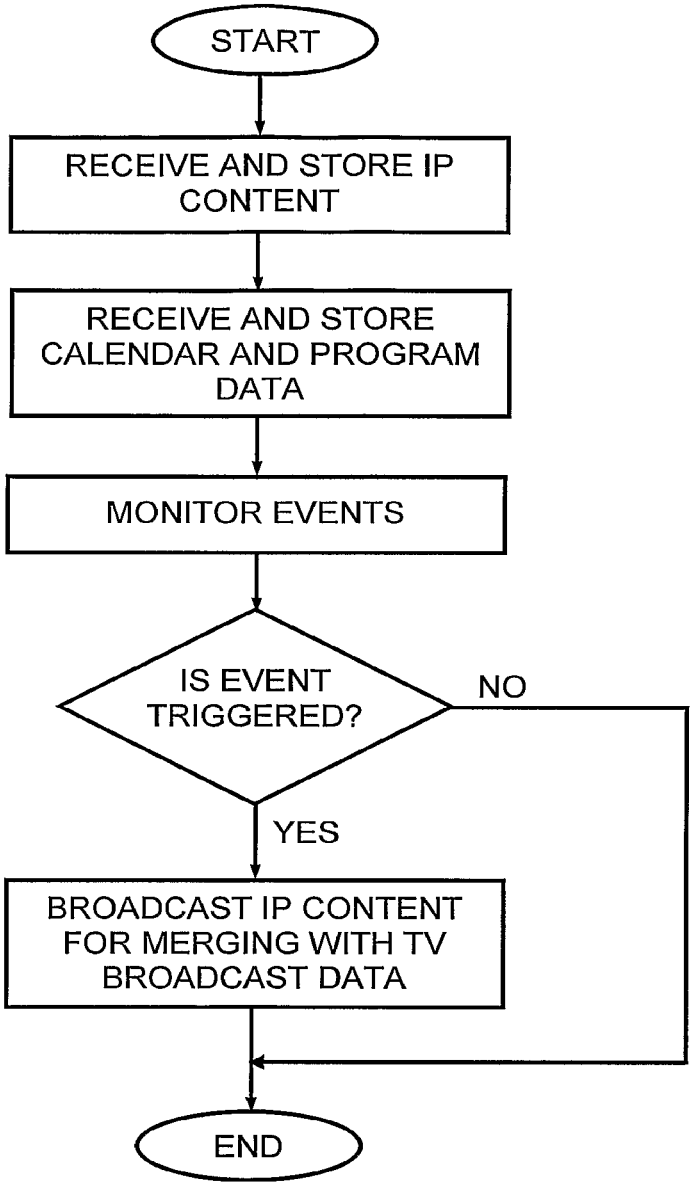
FIG. 2 is a flow diagram showing the principal actions carried out by the web server shown in FIG. 1.

FIG. 2 is a flow diagram showing the principal actions carried out by the web server 14, which is responsive to an event timetable stored and updated in the database 19. To this end, an IP content provider interfaces with the web server for creating IP content and associating therewith calendar and program data indicating dates, times and channels in respect of which the IP content is to be streamed to the customer premises. Once this is done, the web server 14 monitors events, which are triggered in known manner causing the web server 14 to extract from the database 19 pre-stored IP content for streaming over the Internet 15 to the TV-Internet Integration Box 16, where it is processed as described below with reference to FIG. 3 of the drawings.

Figure 3:
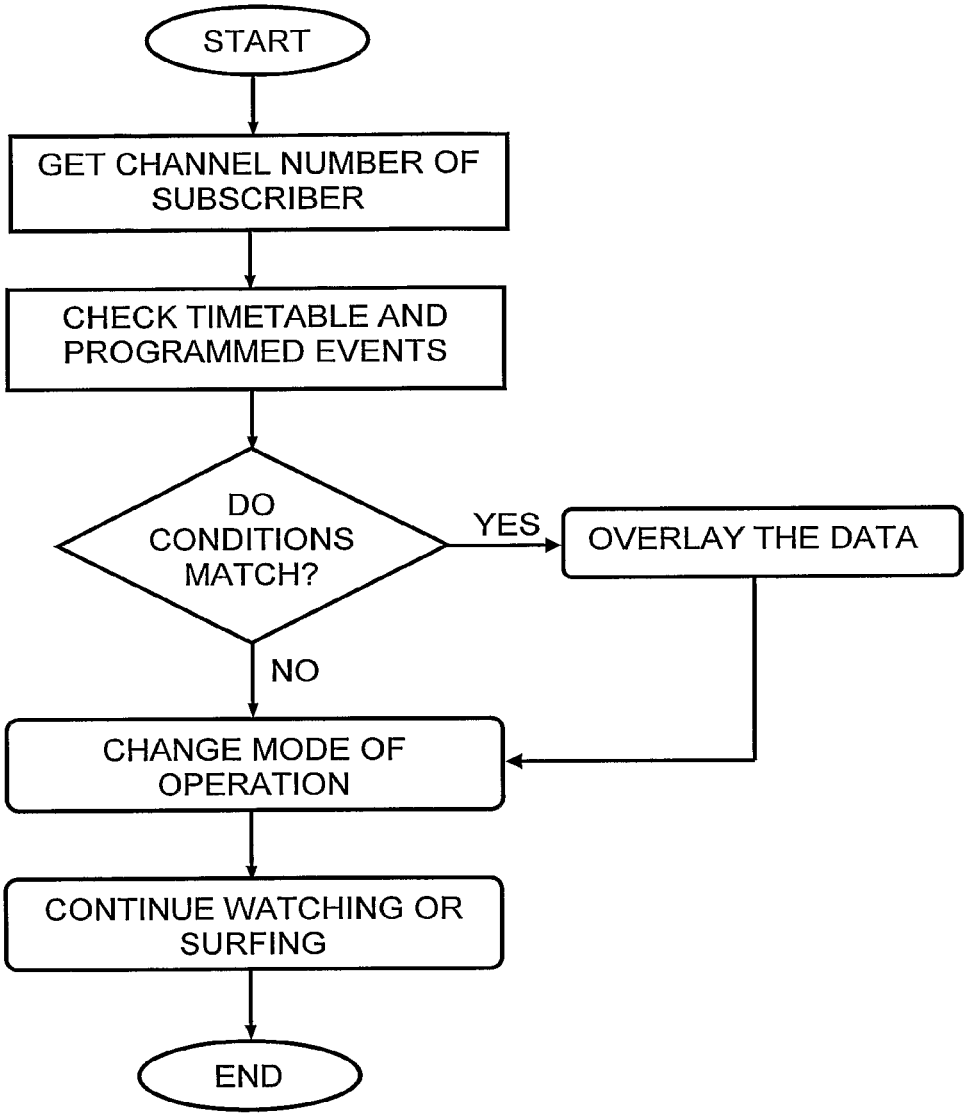
FIG. 3 is a flow diagram showing the principal actions carried out by the TV-Internet Integration Box shown in FIG. 1.

FIG. 3 is a flow diagram showing the principal actions carried out by the TV-Internet Integration Box 16. In accordance with one embodiment of the invention, the subscriber selects what kind of IP content he wishes to receive and in respect of which program details, such as icons and/or textual data, are to be displayed together with the TV broadcast data. For example, a subscriber may wish to block certain types of program material or may wish to [receives] *receive* details thereof only during limited hours, for example when the children are asleep. To this end, the subscriber is able to program the TV-Internet Integration Box 16 in much the same way that a video cassette recorder is programmed so as to store in the memory [25] *26* a timetable indicating what type of IP data is to be displayed and when. The timetable is updated as and when required by the subscriber. The TV-Internet Integration Box 16 is adapted to check the timetable periodically and to filter out incoming IP content that is either of a type that is not required or that is broadcast during an unauthorized time window. By such means, an additional layer of authorization may be provided to that stored in the database 19 for access by the web server 14, thus allowing pre-fetching of IP content and storage in the memory [25] *26* of the TV-Internet Integration Box 16. Upon detecting a matching event, corresponding to received IP content that is of interest to the subscriber, the TV-Internet Integration Box 16 overlays the matched IP content with the current broadcast and displays the new integrated video on the subscriber's TV set 17. For example, the matched information may be an icon that indicates to the subscriber that an Internet movie is currently being broadcast; or it may be an advertisement or information related to the TV program being broadcast.

The subscriber can respond to the overlaid data using a remote control unit, described below with reference to FIG. 6 of the drawings, which is programmed to interact with the displayed icon or other data that is overlaid on the TV broadcast. To this end, the displayed IP content may optionally contain textual information advising the subscriber to press a particular button on the remote control unit. Alternatively, buttons on the remote control unit may be color-coded and the icon may be colored so as to indicate to the subscriber which color-coded button to press for selection of the corresponding IP content. If the subscriber responds to the overlaid data by pressing a button on the remote control unit, the TV-Internet Integration Box 16 receives the signal from the remote control unit and changes the priorities for use with the Picture-in-Picture (PIP) technique to display the TV broadcast in a reduced window and to show the other media, i.e. the IP content, in an enlarged window. The IP content can be a custom designed web page for TV, or a game or advertisement movie or any other information placed on the matched record. PIP techniques are known per se and allow a video or graphics image to be inserted on top of a movie clip and to be positioned and sized. An Effect In and Effect Out may be used to fade or move the inserted video to the screen. In accordance with one such technique, the bulk of the IP content e.g. corresponding to a movie may be rendered transparent so as to provide a transparent window through which an icon e.g. relating to the movie is visible. The video content of the TV broadcast is displayed in one window and the IP content in another window. Since the bulk of the IP content is transparent it will remain invisible to the subscriber, while the icon (or text) will be visible since it is opaque. On selecting the displayed icon, the attributes may simply be reversed so as to hide the icon while displaying the movie or other content. At the same time, the TV broadcast may be re-sized either to display it in a minimized window it the case that it is to be suppressed altogether, or to display it superimposed on the IP content so that both are visible at the same time in different, possibly overlapping, windows.

Figure 4:
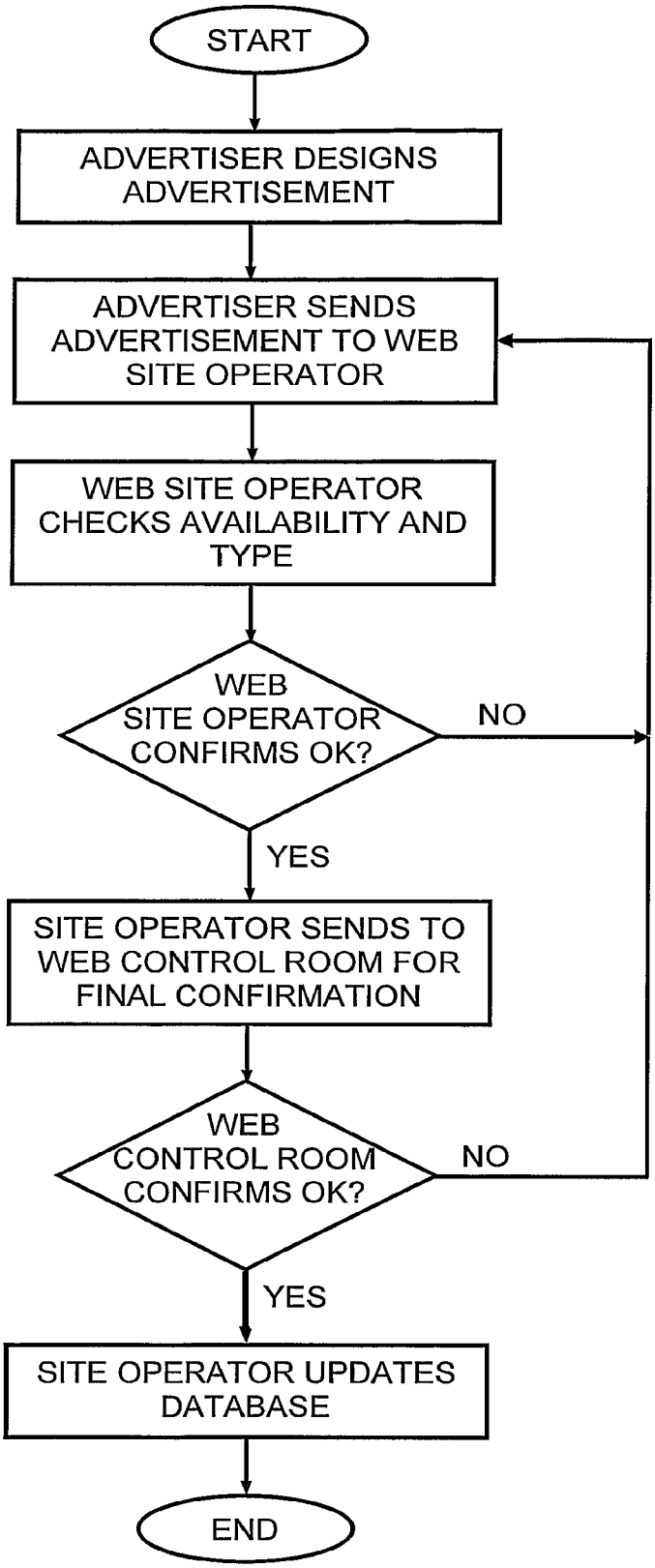
FIG. 4 is a flow diagram showing the principal actions carried out by an IP content provider such as an advertiser for creating IP content for overlaying by the TV-Internet Integration Box with a broadcast TV signal.

FIG. 4 is a flow diagram showing the principal actions carried out by an IP content provider such as an advertiser for creating IP content for overlaying by the TV-Internet Integration Box with a broadcast TV signal. Thus, the advertiser designs an advertisement and sends it together with a request to a web site link via the Internet or off-line as required. Since the IP content is intended for display on a low resolution TV screen, any textual information that forms part of the IP content is formatted so as to be legible when displayed on lower resolution TV screens. Generally, this requires reducing the quantity of textual information to a minimum and sizing any text so that it is legible. Often, a web advertiser will wish to create an on-line advertisement based on an existing web page. In such case, it may be necessary to reduce and resize any textual information so as to comply with these requirements.

The request specifies calendar and program data as explained above, which the web site operator checks for availability and type, defining to which group of users it belongs. If the required time slots are available for the requested channels, the site operator confirms the request and forwards the request to the web control room for final confirmation. On confirming the request, a status flag of the advertisement is changed so as to indicate that the advertisement is awaiting final confirmation from the web control room. At the web control room the advertisement is checked for content by human evaluators who either approve or reject the advertisement content and, in the case of rejection, may provide reasons therefore. If the advertisement (or other IP content) is approved by the web control center, its status is set to "approved" and the web control center bills the customer and the web site operator adds the advertisement and the scheduling information to the database 19. The customer who is billed is typically the advertiser but may be any entity that is identified by a digital signature associated with the advertisement. If either of the requests for approval is rejected the status of the advertisement is set to "rejected" and the web control room informs the advertiser of the grounds for rejection, allowing the advertiser to change the request and re-send to the web site operator. Optionally, in such case the web server may be adapted to display to the advertiser the occupied timetable and suggest new timetable. Only those advertisements whose status flag indicates that they are approved by the web control room are actually available for transmission. The time slot and channel information associated with any advertisement that is not so approved remain available for other advertisements and will be shown as available to another advertiser who attempts to schedule an advertisement. Only when the advertisement is actually approved by the web site operator and its status is updated accordingly, are the transmission time and channel locked for use by other users.

The IP packet data may optionally be associated with predefined user-profiles that are also stored in the database 19 so that the advertisement or other IP data is sent only to specific TV-Internet Integration Boxes. Such user-profiles may be configured by the advertiser or by the user. Thus, for example, the invention allows supplementary or complementary program content to be associated with a TV broadcast, while providing the facility to view the supplementary program content only to specific subscribers, according to their user-profiles.

Thus, by way of non-limiting example, the invention allows sign language to be associated with a TV broadcast for the hard of hearing. It is known to display sign language in a corner of the screen, but since this is usually done indiscriminately it also apt to disturb the majority of viewers who do not need the sign language. The invention may be used to avoid this by conveying the sign language as IP content separate from main TV broadcast and allowing subscribers to register for a "sign language" service so that only registered subscribers receive the IP content. IP content files corresponding to sign language to be associated with different TV broadcasts are created as explained above, and stored in the database 19 together with user-profile data indicating which subscribers are registered to obtain the service. The user-profile data may contain data that further refines the target audience, such as categories of TV program alongside which the sign language is to be displayed. The user-profile data may further contain geographical data or language data that allows sign language corresponding to a target language to be conveyed to specific audiences. By such means, a TV program can be accompanied by a sign language overlay that is customized to a target language depending on the location of the IP target address or the language requested by the subscriber on registering for the service.

Figure 5:
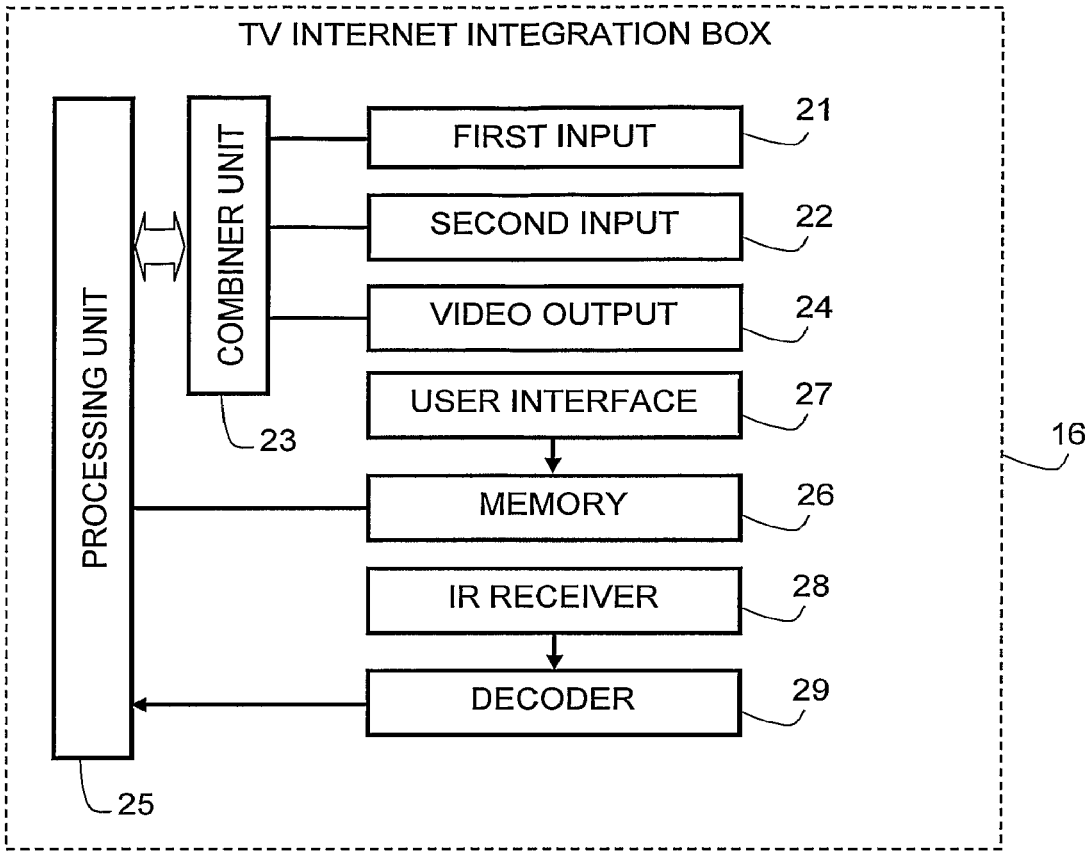
FIG. 5 is a block diagram showing the functionality of the TV-Internet Integration Box shown in FIG. 1.

FIG. 5 is a block diagram showing the functionality of the TV-Internet Integration Box 16 shown in FIG. 1. Thus, the TV-Internet Integration Box 16 comprises a first input 21 for receiving first data corresponding to a TV broadcast signal, typically being a cable TV signal and a second input 22 for receiving respective second data corresponding to IP packet data. The IP packet data may optionally be downloaded to specific TV-Internet Integration Boxes in accordance with predefined user-profiles associated with IP packet data and stored in the database 19. A combiner unit 23 (*e.g., including a circuit*) is coupled to the first and second inputs for combining the first data and the second data to form a combined video signal. A video output 24 is coupled to the combiner unit 23 for conveying the combined video signal to a TV set in a user premises. The TV set may be a conventional TV having a relatively low resolution screen for displaying a first image corresponding to the first data and having superimposed thereon a second image corresponding to the second data. Alternatively, it can be a computer having a video card for displaying a combined video image on a high resolution display monitor.

The combiner unit 23 is shown coupled to a processing unit 25 although in practice it may be implemented in software by the processing unit 25. A memory 26 is coupled to the processing unit 25 for storing program data, such as profiles and program timetables etc. so as to allow the processing unit 25 to filter incoming IP content according to pre-defined profiles and other selection data. The processing unit 25 is also coupled to a user interface 27 that allows the subscriber to program the TV-Internet Integration Box 16 and store the program data in the memory 26. An IR receiver 28 is adapted to receive IR commands from a remote control unit described below with reference to FIG. 6 and is coupled to a decoder 29, which decodes a received IR signal and feeds it to the processing unit 25 for further processing.

Figure 6:
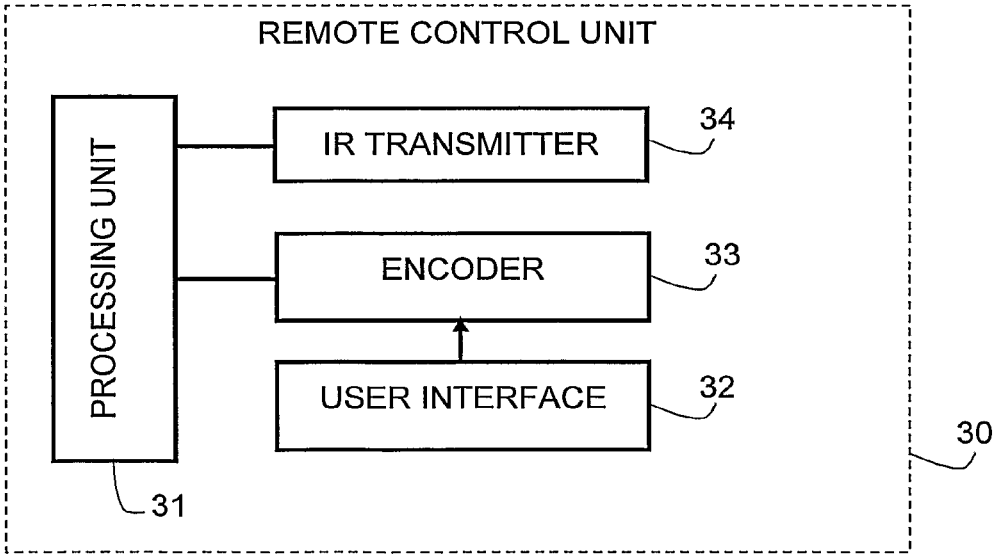
FIG. 6 is a block diagram showing the functionality of a remote control unit for interfacing with the TV-Internet Integration Box shown in FIG. 5.

FIG. 6 is a block diagram showing the functionality of a remote control unit 30 for interfacing with the TV-Internet Integration Box 16 shown in FIG. 5. The remote control unit 30 includes a processing unit 31 coupled to a user interface 32, typically having a keypad or pushbuttons for program selection and setting as well as other functions. The user interface 32 is coupled to an encoder 33 which is responsive to a pressed key or key combination for producing a corresponding IR signal that is transmitted by an IR transmitter 34 to the TV-Internet Integration Box 16 for receipt by the IR receiver 28 thereof.

As noted above, the keys may be color coded in correspondence with pre-arranged colors of commonly displayed icons, so that pressing on a specific key activates the displayed icon of the same color. Alternatively, at least some of the keys may be covered with transfers depicting commonly displayed icons, whereupon the appropriate keys or button for activating each icon are easily recognized.

Figure 7A:
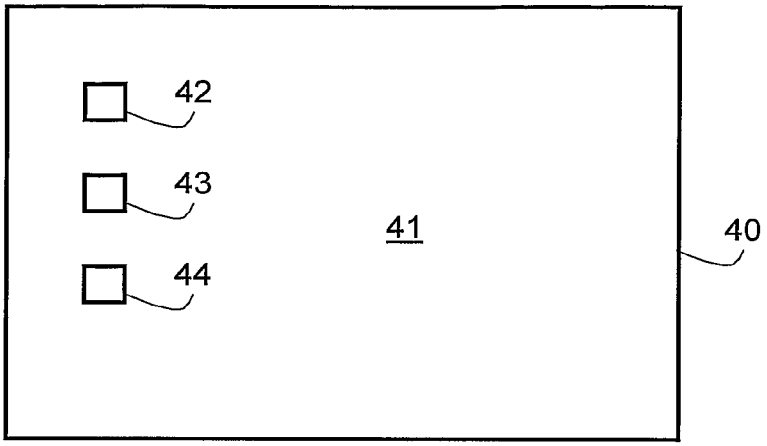
FIGS. 7a, 7b and 7c are pictorial representations showing a TV set during different stages of receiving and displaying combined Internet and broadcast TV signals.
Figure 7B:
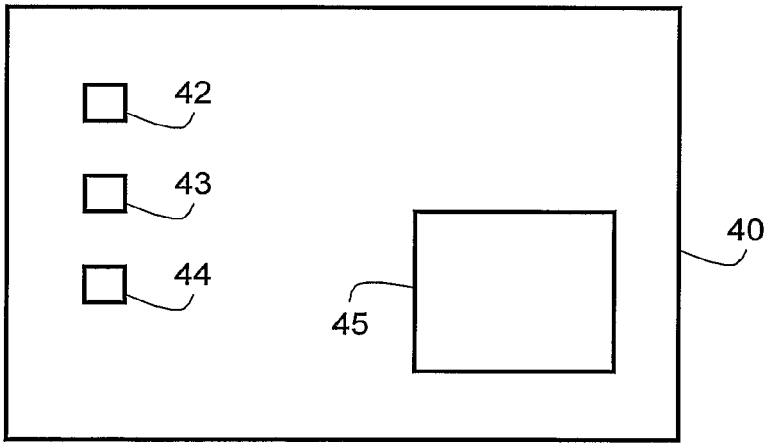
Figure 7C:
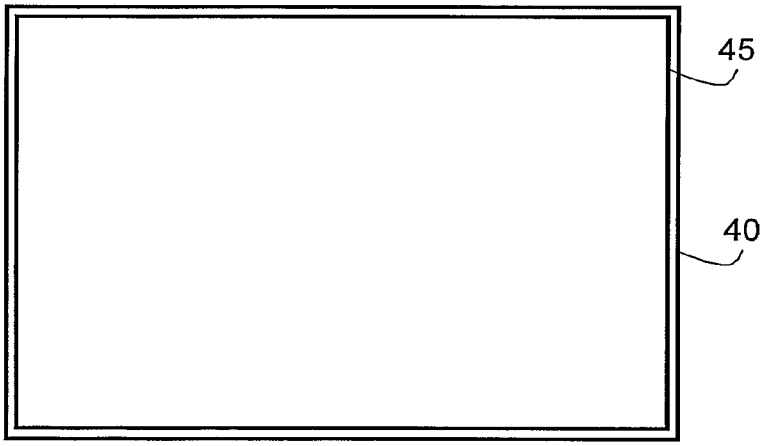

The keys may also be programmed so that depressing the same key more than once automatically re-sizes the windows containing the TV broadcast and the Internet broadcast. For example, FIG. 7a shows the default situation where a TV screen 40 displays a conventional TV broadcast in a window 41 that is sized to occupy the whole area of the TV screen 40 and will be referred to as the primary window. Also shown are IP icons 42, 43 and 44 each of which points to a different IP content that is streamed from a respective web site of known address. On pressing the key on the remote control unit 30 that corresponds to the icon 42, the IP content corresponding thereto is displayed within a small window 45 (referred to as the secondary window) that is contained within the primary window 41 as shown in FIG. 7d. The icons 42, 43 and 44 remain visible so that, if desired, the selected program can be changed by pressing a different key on the remote control unit 30. On pressing a key a second time in succession, the IP content is re-sized so that its window 45 occupies substantially the whole area of the screen as shown in FIG. 7c. On pressing the key a third time in succession, the situation reverts to the default shown in FIG. 7a where the primary window 41 containing the TV broadcast occupies the whole area of the TV screen 40. Thus, each key operates as a three-way toggle that switches between three different display modes.

The second data containing display information for the icons also contains data that informs the TV-Internet Integration Box 16 on which channel or channels the associated IP content is to be streamed and at what times. The second data also specifies the web site where the IP content is located. This is summarized in the following table:

TABLE I

| Second data - definition | | | |
|---|---|---|---|
| Icon image | Channel | Time | Website of IP content |
| ICON.GIF | 2; 23 | 19:30; 21:30 | www.AB.com/adverts/123.htm |

Thus, the second data depicted in Table I above shows that the icon image is contained in a file called ICON.GIF and that the IP content relating thereto is to be streamed on channels 2 and 23 at times 19:30 and 21:30, these being the start times. The end times are determined by the duration of the IP content to be streamed, which is downloaded from a web site whose name is shown in the table and is contained in the second data.

The second data is downloaded from the web server 14 whose web site address is known to the TV-Internet Integration Box 16. In accordance with one embodiment, the processing unit 25 is programmed to access the web server 14 periodically and download current program data. For example, once every 2 to 3 hours the TV-Internet Integration Box 16 may automatically access the web server 14 to download the second data corresponding current program data for the next 3 hours as formatted according to Table I. The downloaded information is stored locally in the memory 26 of the TV-Internet Integration Box 16. This allows the TV-Internet Integration Box 16 to pre-fetch IP content relating to all the currently displayed icons and to store the data relating thereto in the memory 26 thus obviating the need to access the web site of a selected icon for the purpose of downloading IP selected content. Since this carries the overhead of web access and downloading of data, which can be cumbersome particularly if there is insufficient bandwidth, pre-fetching in this manner ensures that initial IP content data will be immediately available on selection of one of the icons.

Figure 8:
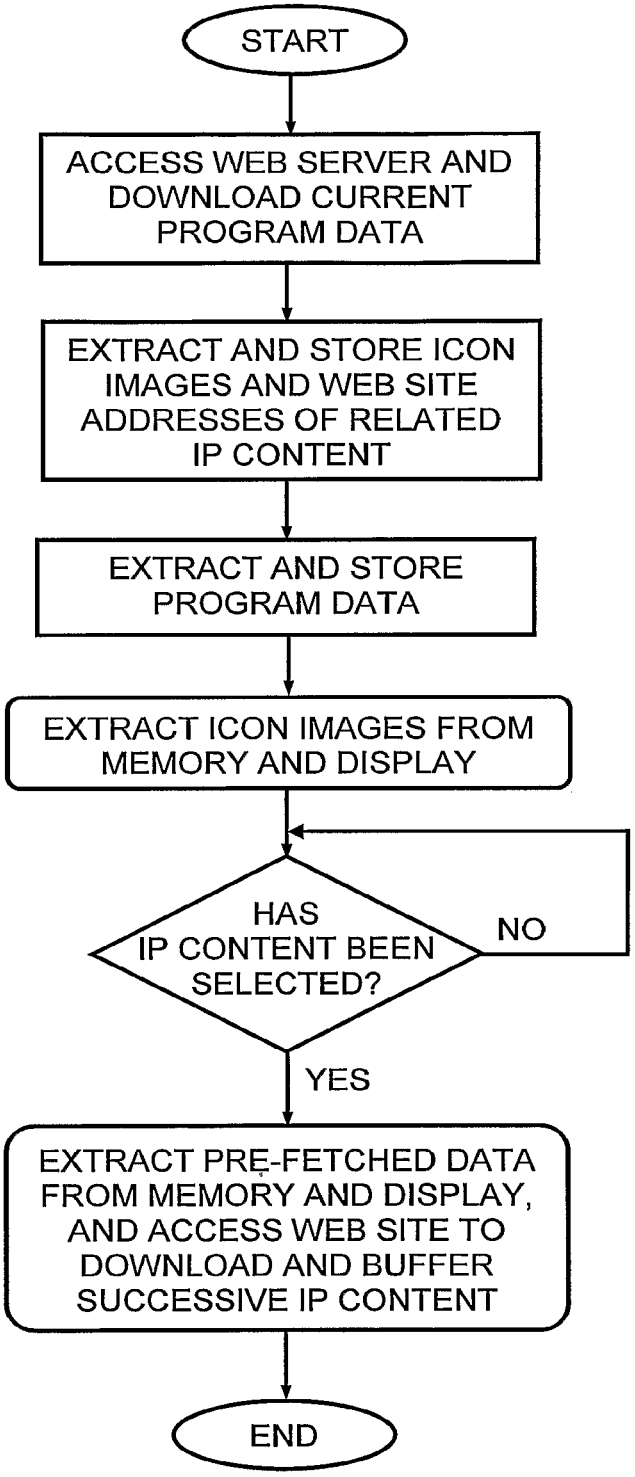
FIG. 8 is a flow diagram showing the principal actions carried out by the TV-Internet Integration Box when prefetching a digital broadcast signal.

FIG. 8 is a flow diagram showing the principal actions carried out by the TV-Internet Integration Box when pre-fetching a digital broadcast signal. Thus, the TV-Internet Integration Box 16 periodically accesses the web server 14 and downloads current program data, constituting the second data. It then extracts from the current program data the image files of the current icons and stores them in the memory 26. In like manner, it extracts the web sites of the IP content corresponding to the currently displayed icons and then accesses these sites to pre-fetch the respective IP content, which it likewise stores in the memory 26. On selection of an icon, the TV-Internet Integration Box 16 opens a secondary window 45 within the primary window 41, reads from the memory 26 the pre-fetched IP content and displays it in the secondary window 45.

It will be understood that the TV-Internet Integration Box according to the invention may be at least partially implemented by a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method for generating at a user's premises an overlay using video signals constituting a first data and overlay-enabling digital data constituting a second data, the method comprising:

(a) providing a combiner circuit at the user's premises, wherein:

the combiner circuit is coupled to a TV set and connected to a separate TV [timer] *tuner* box or TV tuner in the TV set, at the user's premises, and the combiner circuit is also connected through distinct networks to each of a video signal input providing video signals through the *separate* TV tuner box or *the* TV tuner in the TV set, and an Internet data input providing overlay-enabling digital data over the Internet, wherein said video signals and said overlay-enabling digital data are received at the user's premises by different resources as mutually distinct and independent inputs, and wherein said overlay-enabling digital data includes at least:

a Web link indicating a website where content that is associated with said overlay-enabling digital data is stored, an image indicative of the content associated with said overlay-enabling digital data, and an overlay activation criterion; and (b) processing at the user's premises said overlay-enabling digital data and generating at the user's premises a corresponding overlay only if said *overlay* activation criterion is met, wherein generating [an] *the* overlay includes:

generating at the user's premises a first display screen including at least a first portion corresponding to said video signals and a second portion overlaid over said first portion and corresponding at least to said image, and associating the Web link with said second portion of the first display screen thereby allowing a user to cause the combiner circuit to retrieve said content, generate a second video display screen including at least a portion which corresponds to said content, and input the second display screen to said TV set.

2. The method according to claim 1, wherein said overlay-enabling digital data is received at the user premises according to a pre-stored user profile.

3. The method according to claim 1, further including: receiving a command from [a] *the* user at said user premises; and responsive to said command, resizing said first portion and/or said second portion of said first display screen.

4. The method according to claim 1, wherein the content stored at said website enables streaming of digital data over the Internet; and said method further including: pre-fetching and buffering said digital data stream from said website, thereby allowing said digital data stream to be displayed substantially without delay upon redirection by the user.

5. The method according to claim 1, wherein the overlay-enabling digital data comprises data representative of one or more second images, and for each of said one or more second images said overlay-enabling data comprises respective web site addresses where IP content associated with the respective second image is stored, and wherein said generating [an] *the* overlay further includes within said first display said one or more second images.

6. The method according to claim 1, wherein the overlay-enabling digital data is supplementary or complementary to the video signals.

7. The method according to claim 1, wherein the image includes an icon that indicates to the user that digital data from Internet content is currently being provided and which provides an indication of a nature of said Internet content.

8. The method according to claim 1, wherein the image contains textual information advising the user to press a particular button on a remote control unit.

[9. The method according to claim 1, wherein said overlay activation criterion includes at least one of the following: a timing information, data specifying one or more TV subscriber channels, a user command information.]

10. The method according to claim 5, further including:

periodically accessing a web server for downloading said overlay-enabling digital data;

extracting from the overlay-enabling digital data said one or more second images and the respective web sites corresponding to each of said second images;

retrieving and storing digital content from said web sites; and if the overlay activation criterion is met and a user command that is associated with an image from amongst said one or more second images is identified, displaying the respective image from amongst the second images, accessing the respective web site associated with the displayed image and extracting and buffering content from the website.

11. The method according to claim 5, further comprising displaying a respective IP content when a corresponding one of said one or more second images is selected.

12. The method according to claim 7, including selecting specific Internet content by pressing a color-coded button on a remote control in accordance with a color of said icon.

13. A TV-Internet Integration circuit for generating at a user's premises an overlay using video signals constituting a first data and overlay-enabling digital data constituting a second data, the TV-Internet Integration [Box] *circuit* comprising:

a combiner circuit at [a] *the* user's premises coupled to a separate TV tuner box or TV tuner, wherein the combiner circuit is also connected through distinct networks to each of a video signal input providing video signals through the TV tuner box or TV tuner, and an Internet data input providing overlay-enabling digital data over the Internet, wherein said video signals and said overlay-enabling digital data are received at the combiner circuit at the user's premises by different resources as mutually distinct and independent inputs, and wherein said overlay-enabling digital data includes at least:

a Web link indicating a website where content that is associated with said overlay-enabling digital data is stored;

an image indicative of the content associated with said overlay-enabling digital data; and an overlay activation criterion, wherein the combiner circuit is responsive to [an] *the* overlay activation criterion being met for generating a corresponding overlay, including:

generating at the user's premises a first display screen including at least a first portion corresponding to said video signals and a second portion overlaid over said first portion and corresponding at least to said image, and associating the Web link with said second portion of the first display screen thereby allowing a user to cause the combiner circuit to retrieve said content, and generate a second video display screen including at least a portion which corresponds to said content; and a video output interface, coupled to or integrated within the combiner circuit and configured to be coupled to a video input of said TV set and to display said first display screen or said second video display screen.

14. The TV-Internet Integration circuit according to claim 13, wherein said overlay-enabling digital data is received at the user premises according to a pre-stored user-profile.

15. The TV-Internet Integration circuit according to claim 13, further including:

a command input for receiving a command from [a] *the* user at said user premises; and a frame adjuster for resizing said first portion and/or said second portion of said first display screen in response to said command.

16. The TV-Internet Integration circuit according to claim 13, further including:

a receiver for receiving a digital data stream, wherein the stream of the digital data is enabled by the content stored at said website; and a processing unit for pre-fetching and buffering said digital data stream from said website, thereby allowing said digital data stream to be displayed substantially without delay upon redirection by the user.

17. The TV-internet Integration circuit according to claim 13, wherein the overlay-enabling digital data comprises data representative of one or more second images, and for each of said one or more second images said overlay-enabling data comprises respective web site addresses where IP content associated with the respective second image is stored, and wherein the combiner circuit is configured to:

periodically access a web server for downloading said overlay-enabling digital data;

extract from the overlay-enabling digital data said one or more second images and the respective web sites corresponding to each of said second images;

retrieve and store digital content from said web sites; and if the overlay activation criterion is met, and a user command that is associated with an image from amongst said one or more second images is identified, display the respective image from amongst the second images, access the respective web site associated with the displayed image and extract and buffer content from the website.

18. The TV-Internet Integration circuit according to claim 13, wherein the image includes an icon that indicates to the user that digital data from Internet content is currently being provided and which provides an indication of a nature of said Internet content.

19. The TV-Internet Integration circuit according to claim 13, wherein the image contains textual information advising the user to press a particular button on a remote control unit.

[20. The TV-Internet Integration circuit according to claim 13, wherein said overlay activation criterion includes at least one of the following: a timing information, data specifying one or more TV subscriber channels, a user command information.]

21. The TV-Internet Integration circuit according to claim 18, wherein the icon is colored so as to allow user selection of a specific Internet content by pressing a color-coded button on a remote control in accordance with a color of said icon.

* * * * *